(No Model.)
W. SELLERS.
HORSE COLLAR.
No. 497,502. Patented May 16, 1893.
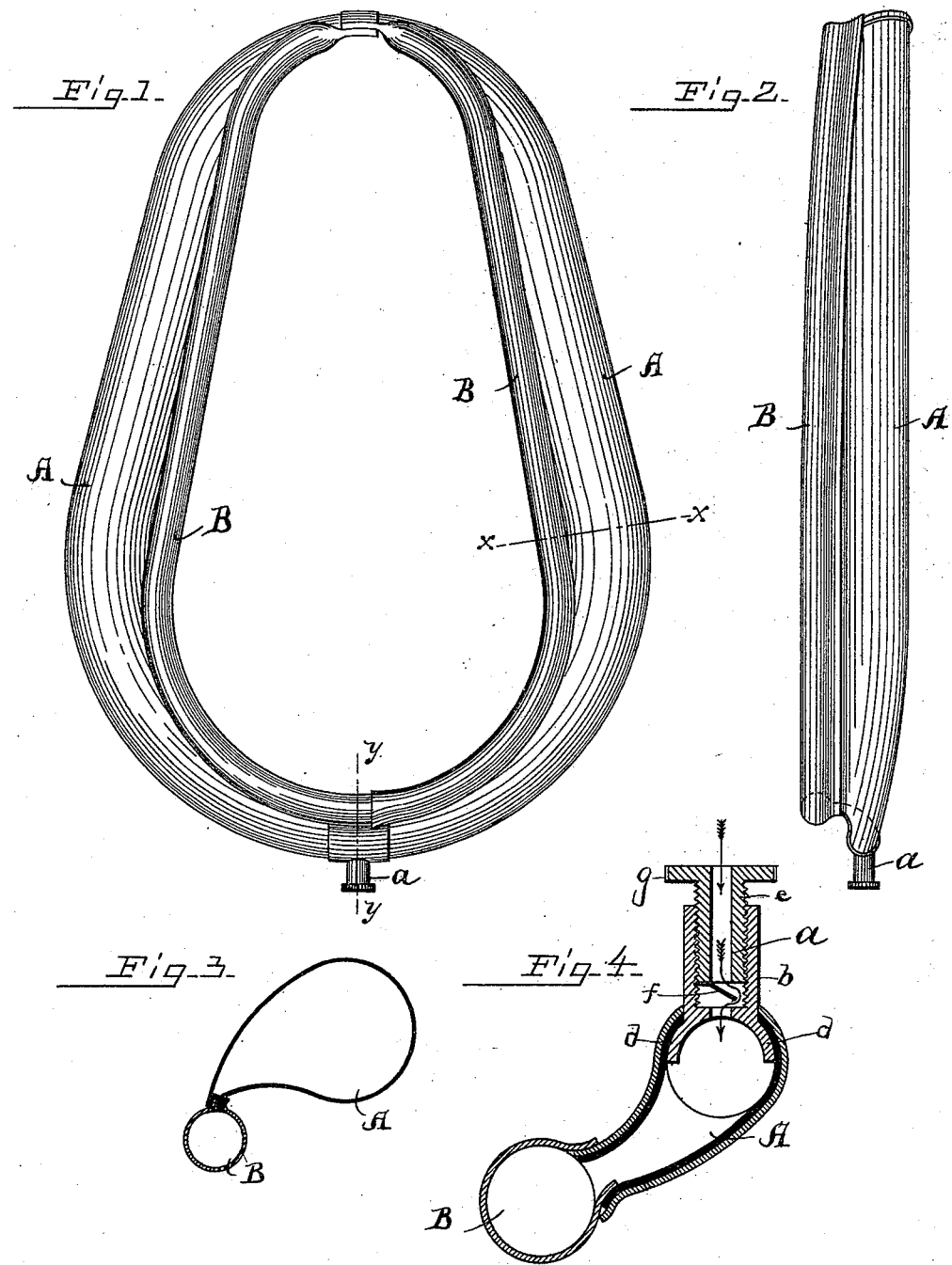

UNITED STATES PATENT OFFICE.

WILLIAM SELLERS, OF HAVERHILL, ASSIGNOR OF ONE-HALF TO HERBERT E. WALES, OF BRADFORD, MASSACHUSETTS.

HORSE-COLLAR.

SPECIFICATION forming part of Letters Patent No. 497,502, dated May 16, 1893.

Application filed October 19, 1892. Serial No. 449,361. (No model.)

*To all whom it may concern:*

Be it known that I, WILLIAM SELLERS, a citizen of the United States, residing at Haverhill, in the county of Essex and State of Massachusetts, have invented certain new and useful Improvements in Horse-Collars, of which the following, taken in connection with the accompanying drawings, is a specification.

When horses' collars are formed of leather stuffed with straw or such like material it generally causes the collar to be hard and unyielding as well as heavy for the horse to carry.

The object of my invention is to produce a horse collar that will be light and soft to the horse's neck and shoulders.

The invention consists in a collar the outer wales or body, and fore wales or small roll of which are formed of an elastic material so constructed that they can be filled with air to maintain the collar in its proper shape.

Referring to the accompanying drawings: Figure 1—represents a front view of a horse's collar embodying my invention. Fig. 2— is a side view of the same. Fig. 3 — is a cross section taken on line $x, x,$ of Fig. 1, but drawn to a larger scale. Fig. 4—is a vertical section taken on line $y, y,$ of Fig. 1, drawn to a larger scale and inverted.

A, represents the after wales or body, B, the fore wales or small roll, each of which is formed hollow, and of any suitable air tight material. At the lower portion of the after wales or body A, is fitted a small air valve $a$. The after wales or body A, is in connection at a point opposite the valve $a$, with the fore wales or small roll B, as shown in Fig. 4, so that when air is forced into the collar through the valve $a$, both the after wales or body A, and the fore wales or small roll B, will be inflated with air so as to keep the parts practically rigid so that when the hames are applied thereto they will have a solid bearing while at the same time the portion of the collar that rests against the horse's neck and shoulders will be soft and to a certain extent yielding thereby preventing chafing.

As shown in Fig. 4, the valve $a$ consists of a tubular socket, having its lower end provided with a perforation $c$ and with extended portions $d, d,$ the latter of which fits within the wale of the collar and are secured thereto in any desired manner to prevent the removal of the socket after it has once been secured in place. Within this socket, which is interiorly screw-threaded, fits a perforated plug $e$, having a valve $f$ at its lower end and a milled head $g$ at its outer end for screwing it into the socket $b$. By means of this construction when the plug is not screwed in its full depth, it will permit of the valve $f$ opening when air is forced in through the tube and into the collar. As soon as the collar is filled with air the plug is screwed in its full depth which will cause the valve to engage with the bottom of the socket and to be forced against the end of the plug, thus closing the hole in the plug and preventing the escape of air from the collar until the plug has been unscrewed in the socket sufficiently. It is evident, however, that ordinarily the pressure of the air upon the inner side of the valve will force it against the inner end of the plug tight enough to prevent the escape of the air, but in order to insure its being closed against the end of the plug at all times and under all circumstances, I prefer to construct the parts so that the end of the plug shall come close enough to the bottom of the socket to hold the valve in position.

By making both wales of the collar inflatable and connecting them together by a passage so that the air can pass from the one to the other as the pressure is varied by the movement of the animal, or the change in the load, a very desirable result is obtained, and by locating the valve directly opposite the communicating passage between the two wales, the air can be forced into both wales very easily and uniformly, and it can also be easily removed from the collar when desired.

Although I have shown and described a particular form of valve secured to the fore wale, it is evident that it may be of any other suitable form, and may be secured to either wale without departing from the spirit of my invention.

What I claim as my invention is—

An inflatable horse collar, both wales of which are formed of air-tight material and having an air passage forming a communication therebetween, and a valve in the fore wale directly opposite the passage between the two wales and communicating therewith, substantially as set forth.

In testimony whereof I have signed my name to this specification, in the presence of two subscribing witnesses, on this 28th day of September, A. D. 1892.

WILLIAM SELLERS.

Witnesses:
J. E. HANLY,
EDWIN PLANTA.